May 28, 1968 E. K. CURNOW ET AL 3,385,121
METHOD AND APPARATUS FOR THE CYCLIC ROTATION OF CLUSTERS
OF ARTICLES OF POLYGONAL PRISMATIC SHAPE
Filed April 26, 1965 3 Sheets-Sheet 1

Inventors
Eric Kenneth Curnow
Alfred Walter Gunter
By Cushman, Darby & Cushman
Attorney United States Patent Office 3,385,121
Patented May 28, 1968

3,385,121
METHOD AND APPARATUS FOR THE CYCLIC ROTATION OF CLUSTERS OF ARTICLES OF POLYGONAL PRISMATIC SHAPE
Eric Kenneth Curnow and Alfred Walter Gunter, Ottawa, Ontario, Canada, assignors to Atomic Energy of Canada Limited, Ottawa, Ontario, Canada, a corporation of Canada
Filed Apr. 26, 1965, Ser. No. 450,681
Claims priority, application Canada, Mar. 10, 1965, 925,268
8 Claims. (Cl. 74—128)

This invention relates to an apparatus for cyclically rotating clusters of products during radioactive irradiation, said products having polygonal prismatic configuration.

In applicant's co-pending U.S. application Ser. No. 450,682, filed Apr. 26, 1965, now abandoned, there is disclosed a method and apparatus for batch irradiation of substances. In that application there were shown batches of substances mounted for rotation about a first axis and relative to a radioactive source on a second axis coaxially disposed to said first axis in such a way that the distribution of irradiation dosage was improved. Where the rotated batched substances have circular cross-sections, adjacent batches may be placed in juxtaposition with only sufficient space between them to prevent rubbing. When the batched substances have square, pentagonal, or other polygonal cross-sections, their respective axes of rotation must be displaced further from the source than would be required for circular cross-sections of an equivalent area. Such further displacement from the source reduces the intensity of irradiation in the substances being irradiated thereby requirinng longer irradiation periods or more powerful sources. In the present application there is shown a unique method of substantially increasing the radiation utilization efficiency without adversely affecting the uniformity of absorption of radiation in a product being irradiated by rotating articles or containers of polygonal prismatic configuration which articles or containers are initially clustered together with faces of adjacent prisms initially in contact.

It is an object of one aspect of this invention to provide apparatus for imparting selective intermittent reciprocating movement to an article having a longitudinal axis in directions transverse to said axis and to unidirectionally rotating said article during a portion of the said movement of one selected direction.

In accordance with the foregoing aspect of the invention, the invention comprises: a support for said article permitting rotation of said article about said longitudinal axis; guide means for said support restraining its movement in said directions; an actuator for imparting said intermittent reciprocating movement; a projection associated with said support; and, detent means engaging said projection during movement of said article in said selected direction to impart said unidirectional rotation and disengaging said projection during movement of said article in the opposite of said direction.

A preferred embodiment of the invention will now be described with reference to the accompanying drawings, in which, FIG. 1 is an end view of a cluster of hexagonal prisms in close juxtaposition.

Figure 1:
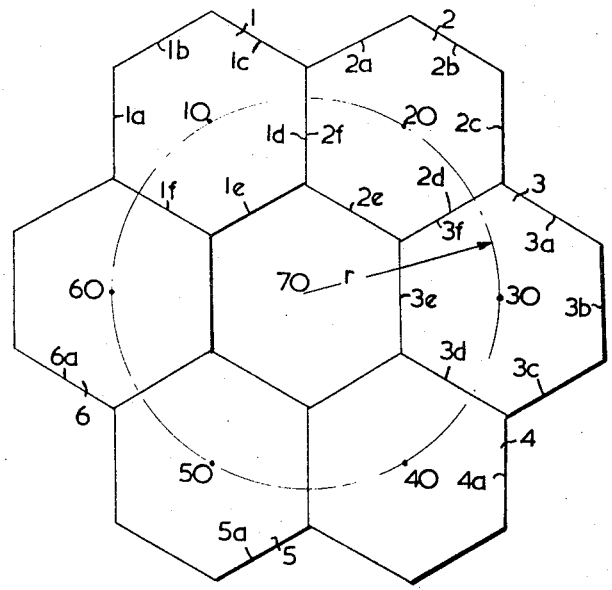

Referring now to FIG. 1, there is shown, in end view, a cluster of six hexagonal prisms 1–6, wherein the prisms have sides 1a–1f, 2a–2f, etc., and the prisms are closely clustered with sides 1d and 2f, 2d and 3f, 3d and 4f, 4d and 5f, 5d and 6f, and 6d and 1f in close juxtaposition. The prisms 1–6 have respective axes 10, 20, 30, 40, 50 and 60 all of which are located on and equally spaced around a pitch circle having a radius $r$.

Figure 2:
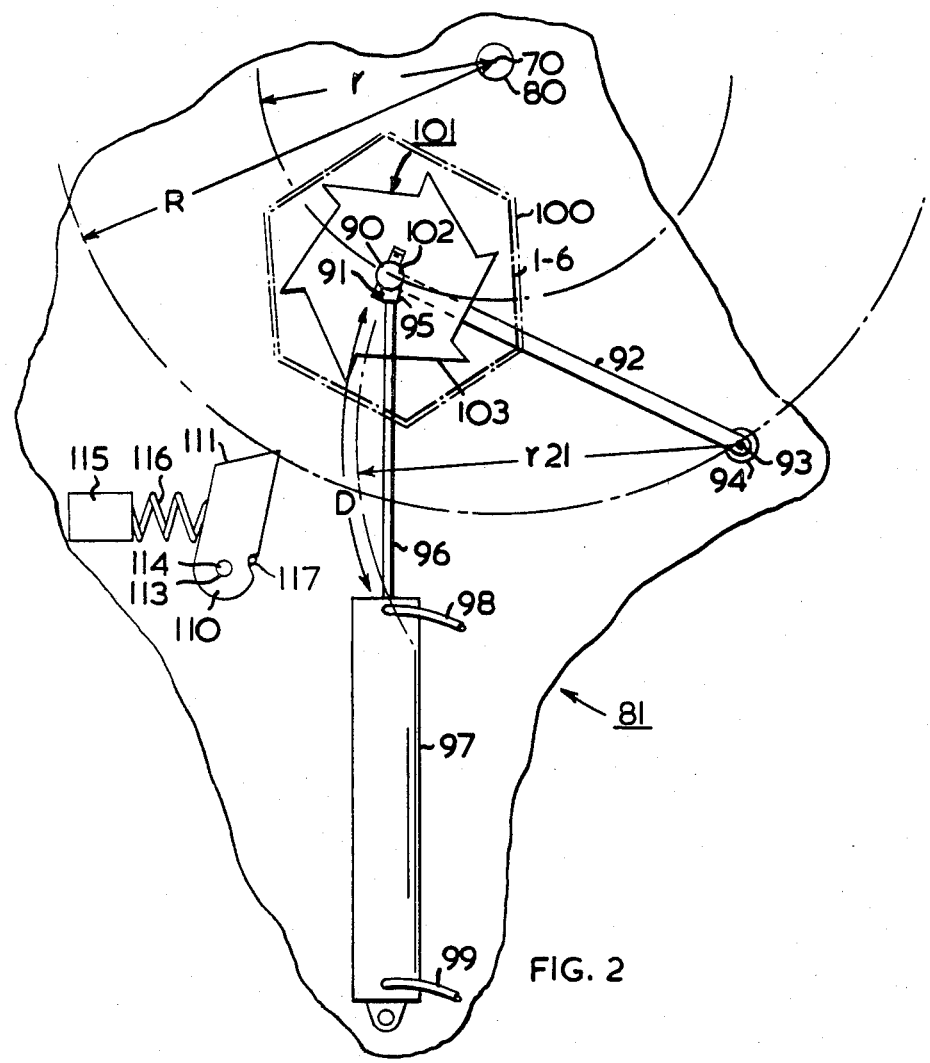
FIG. 2 is an end view of one of six identical mechanisms for separating the cluster of prisms and for partially rotating each prism with each prism being initially disposed on a common pitch circle of radius $r$.
Figure 3:
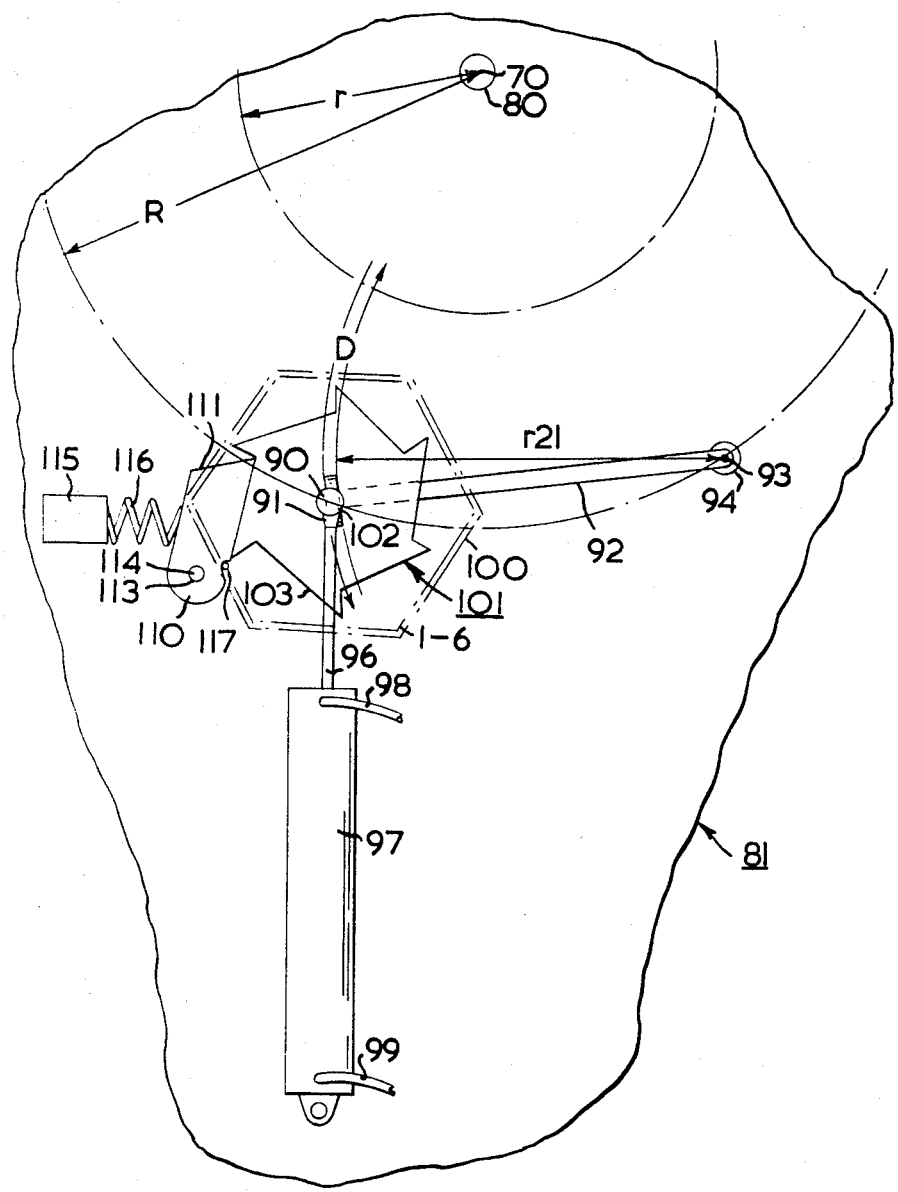
FIGURE 3 is an end view substantially as shown in FIGURE 2 with each prism moved outwardly to a larger common pitch circle of radius R.

Referring now to FIG. 2, there is shown dotted one of the hexagonal prisms 1–6 initially disposed on a common pitch circle of radius $r$ and mechanism for moving the prisms outwardly to a larger pitch circle of radius R, and for imparting a unidirectional rotation of 60° to the prisms during such outward movement. The hexagon articles are supported on hexagonal platforms one of which is indicated at 100. Once located on the circle R the prisms 1 to 6 are sufficiently spaced apart to be individually rotatable about their respective axis. A radioactive source 80 is located along the geometric centre line 70 of the cluster. Each table, for example 100, is supported by an individual spindle, one such spindle being shown at 90, the individual spindles having rollers 91 for vertical support by structure, a portion of which is generally indicated at 81, and maintained in vertical positions by radius plates 92 firmly affixed to the spindles 90 at one end and to pivots 93 at the other end, each spindle being supported for rotation in bearings 94 attached to the said structure. Attached to the spindles 90 are trunnion bearings 95 in which are pivoted piston rods 96 of two-way air-cylinders 97 which are actuable by air applied to connectors 98 and 99.

On the underside of the platform 100, and rigidly affixed thereto is an index wheel 101 having an aperture 102 therein and through which the spindle 90 is received for rotation therein. The index wheel has six ratchet teeth 103 spaced around its periphery.

A pawl 110 having faces 111 and 112 has an aperture 113 freely rotatable about a pivot affixed to the said structure and having an axis 114. A stop 117 is provided to prevent excessive clockwise movement of the pawl. An anchor block 115 is also attached to the said structure, and between the anchor block 115 and the pawl 110 there is disposed a compression spring 116. The axis of the prisms, for example, 90 and the axis 114 that of the pawls 110 are parallel and initially separated by a distance which permits rotation of the index wheels 101 by one tooth when the axis 90 moves outwardly, substantially towards the pawl axis 114 by a distance proportional to the stroke of the air cylinder 97, a distance which is designated D on FIG. 2. An indexing portion of the pawl designated "d" 110 extends from the face 111 along the side 112.

In operation compressed air is initially supplied to all six connections 98 on the six cylinders 97. The cylinders, via piston rods 96, move each of the platforms, for example, 100 outwardly, by rotation about pivots 93, until the teeth 103 on the respective index wheels 101 engage the pawls 110. Further, outward movement of the platforms causes the pawls 110 to turn the index wheels 101 through an angle of 60°. The air supply to connections 98 is then cut off and compressed air applied to connection 97 causing the platforms to return to their original positions, but rotated through 60°.

While the cluster of hexagonal prisms 1–6 are being intermittently and collectively moved outwardly and rotated the source 80 may be moved continuously or intermittently up and down to assist in the distribution of substantially equal dosage to all parts of the batched substances.

The above embodiment has been described with reference to a cluster of hexagonal prisms, but it is obvious that pentagonal, heptagonal, octagonal, nonagonal, etc., prisms could be used, providing close clustering is required, the number of prisms is numerically equal to the number of sides on the prisms.

While the apparatus is particularly useful in closely clustering polygonal prism shapes, it is obvious that other non-cylindrical configurations which require varying degrees of separation before the rotation thereof, will benefit by the use of mechanism herein disclosed. Also, it is envisaged that a hydraulic ram, an electrical ram or other linear actuator may be used in place of the air cylinder.

Further, the embodiment described has been applied to the apparatus for the irradiation of substances having polygonal prismatic configurations. It will be obvious to those skilled in the art that the cycling mechanism has application in other branches of technology.

We claim:
1. Apparatus for imparting intermittent and coextensive movement in alternate directions along a curved path to an article having a longitudinal axis disposed perpendicular the plane of said path and to turning said article about said longitudinal axis by selected acute angle during each movement in a selected one of said alternate directions, said apparatus comprising:
   (i) main support structure, and a unit comprising
   (ii) an article support rotatable about the said longitudinal axis of the article,
   (iii) elongate guide means having one end pivoted to said main structure and the other end carrying said article support, said guide means restraining said article support to movement along said curved path,
   (iv) an actuator on said main support structure having its moveable element coupled to said article support for imparting said movement along said curved path,
   (v) a series of projections on said article support, said projections being equally spaced and concentrically arranged in a plane perpendicular to and moveable about an axis aligned with the axis of said article support,
   (vi) pawl means mounted on said main support structure positioned for interaction with successive individual ones of said projections to impart said acute angular rotation to said article when said article support moves in said selected one of said alternate directions.
2. Apparatus according to claim 1 wherein said elongate guide means is a radius rod.
3. Apparatus according to claim 1 wherein said actuator is a linear actuator pivoted at one end thereof to said main support and pivoted at the other end thereof to sa d article support.
4. Apparatus according to claim 1 wherein item (v) comprises a ratchet wheel.
5. Apparatus according to claim 4 wherein said pawl means is resiliently urged into engagement with said ratchet wheel.
6. Apparatus according to claim 1 wherein there are $n$ units, disposed on said main support and concentrically arranged about a main axis perpendicular to said main support, said actuators simultaneously moving each of said article supports toward or away from said main axis, the said longitudinal axes of said supports being moveable between common inner and outer radii with reference to said main axis.
7. Apparatus according to claim 6 wherein said article supports are of polygonal cross section each having $n$ sides.
8. Apparatus in accordance with claim 7 wherein two sides of each polygon are parallel to and in close juxtaposition with corresponding sides of adjacent polygons when all of said article supports are located in the common inner radius position.

References Cited
UNITED STATES PATENTS 2,925,052   2/1960   Glass _____ 74—128 X FRED C. MATTERN, Jr., *Primary Examiner.*

W. S. RATLIFF, *Assistant Examiner.*